United States Patent [19]
Waber
[11] Patent Number: 4,586,856
[45] Date of Patent: May 6, 1986

[54] ADJUSTABLE MOBILE SUPPORT FOR ELECTRIC DRILL

[76] Inventor: Morris L. Waber, 3006 Coy Ave., Kalamazoo, Mich. 49001

[21] Appl. No.: 607,274

[22] Filed: May 4, 1984

Related U.S. Application Data

[63] Continuation-in-part of Ser. No. 315,915, Oct. 28, 1981, Pat. No. 4,461,594.

[51] Int. Cl.[4] .............................................. B23B 45/14
[52] U.S. Cl. ...................................... 408/92; 408/712
[58] Field of Search .............. 29/26 A, 560; 409/235, 409/241; 408/234, 236, 237, 87, 92, 712; 248/647, 662, 234; 403/59

[56] References Cited

U.S. PATENT DOCUMENTS

| | | | |
|---|---|---|---|
| 391,391 | 10/1888 | Sangster | 408/92 |
| 2,362,929 | 11/1944 | Richards | 408/92 |
| 3,357,445 | 12/1967 | Daugherty | 408/92 X |
| 3,417,949 | 12/1968 | Waber | 408/92 |
| 3,711,214 | 1/1973 | Cloutier | 29/560 |
| 3,834,828 | 9/1974 | Kikuchi | 408/92 |
| 3,967,687 | 7/1976 | Fowler | 408/92 |
| 4,461,594 | 7/1984 | Waber | 248/647 |

FOREIGN PATENT DOCUMENTS

| | | | |
|---|---|---|---|
| 470460 | 1/1929 | Fed. Rep. of Germany | 408/52 |

*Primary Examiner*—William R. Briggs
*Attorney, Agent, or Firm*—Austin A. Webb

[57] ABSTRACT

A wheeled carriage has an upright column with a laterally projecting and vertically adjustable arm thereon. The projecting end of the arm has a dove-tail connector thereon rotatably adjustable in a horizontal plane; a tubular feed screw support has a mating dove-tail part on its bottom side engageable with the connector. The end of the feed screw support has a second dove-tail connector thereon and rotatably adjustable in a vertical plane. A bracket attachable to the motor of an electric drill has a second mating dove-tail part engageable with the second connector with the shaft of the drill chuck aligned with the axis of the tubular support. Two spaced tubular chucks are mounted on opposite sides of the tubular support to receive and releasably lock anchor cables parallel to the drill.

A modification interposes a horizontally rotatable connector bar with a mating dove-tail part on its side, and a dove-tail connector on one end, between the arm on the upright and bracket supporting the drill motor.

Manual and power driven feed screw supports are disclosed.

12 Claims, 9 Drawing Figures

ADJUSTABLE MOBILE SUPPORT FOR ELECTRIC DRILL

OUTLINE OF INVENTION

This invention is an improvement on that disclosed in my prior U.S. Pat. No. 3,417,949, dated Dec. 24, 1968 and is a continuation in part of my application, Ser. No. 06/315,915 filed Oct. 28, 1981 now U.S. Pat. No. 4,461,594. The improvement lies in providing greater rigidity of position of the drill by means of cable grippers positioned in the plane of the drill, in all adjusted positions. A further improvement is the provision of a third plane of adjustment for the drill, by means of a detachable intermediate support member which fits the lockable joints of the base and the drill support.

The drill support may have manual feed of automatic power feed.

DETAILED DESCRIPTION

The drawings, of which there are five sheets, illustrate a preferred form of the support, with both manual feed and power feed mounts for the drill, and with two selectively detachable intermediate supports.

Figure 1:
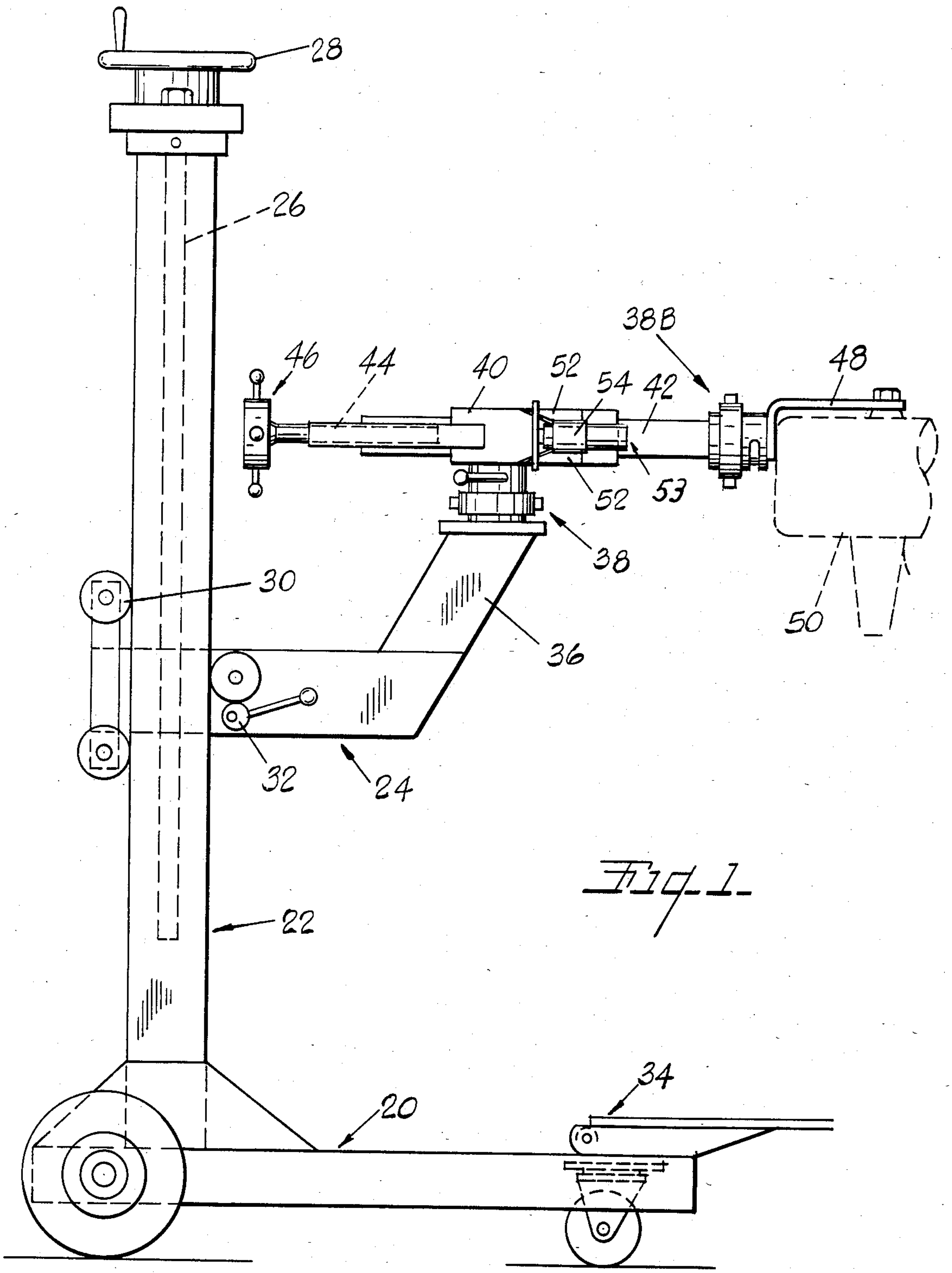
FIG. 1 is a side elevational view of a manual feed support for the drill mounted on a wheeled carriage.

As is shown generally in FIG. 1, the drill support comprises a wheeled base 20, with an upright column 22 near its rear edge. A main support arm 24 is movable vertically by a lift screw 26 operated by a hand wheel 28. Motion is guided by rollers 30, and the arm may be clamped in vertically adjusted positions by an eccentric clamp 32. An alternative work support platform 34 pivoted near the forward or right edge of the base may be folded back when not needed.

The outer right end of the arm 24 carries an inclined strut 36 on the top of which is mounted a first angularly adjustable and selectively releasable connector assembly indicated generally at 38. The upper part of the assembly is fixedly secured to a feed screw support tube 40 which will be described in greater detail presently. An inner slide tube 42 is adjustable axially of the support 40 by a feed screw 44 which in this example is manually operable by the hand wheel 46.

Secured to the outer end of the slide tube 42 is a second angularly adjustable and releasable connector assembly indicated generally at 38B. The assemblies 38, 38B and others to be described presently are similar. It is noted at this time that connector assembly 38 adjusts about an upright or vertical axis, while assembly 38B adjusts angularly about a horizontal axis; and that the axes intersect within the support tube 40. An adjustable and removable part of assembly 38B includes an angled drill support bracket 48 which is adapted to be releasably connected to a conventional electric drill shown by the broken lines at 50. The feed screw support tube 40 and the slide 42 are of rectangular cross section.

Figure 5:
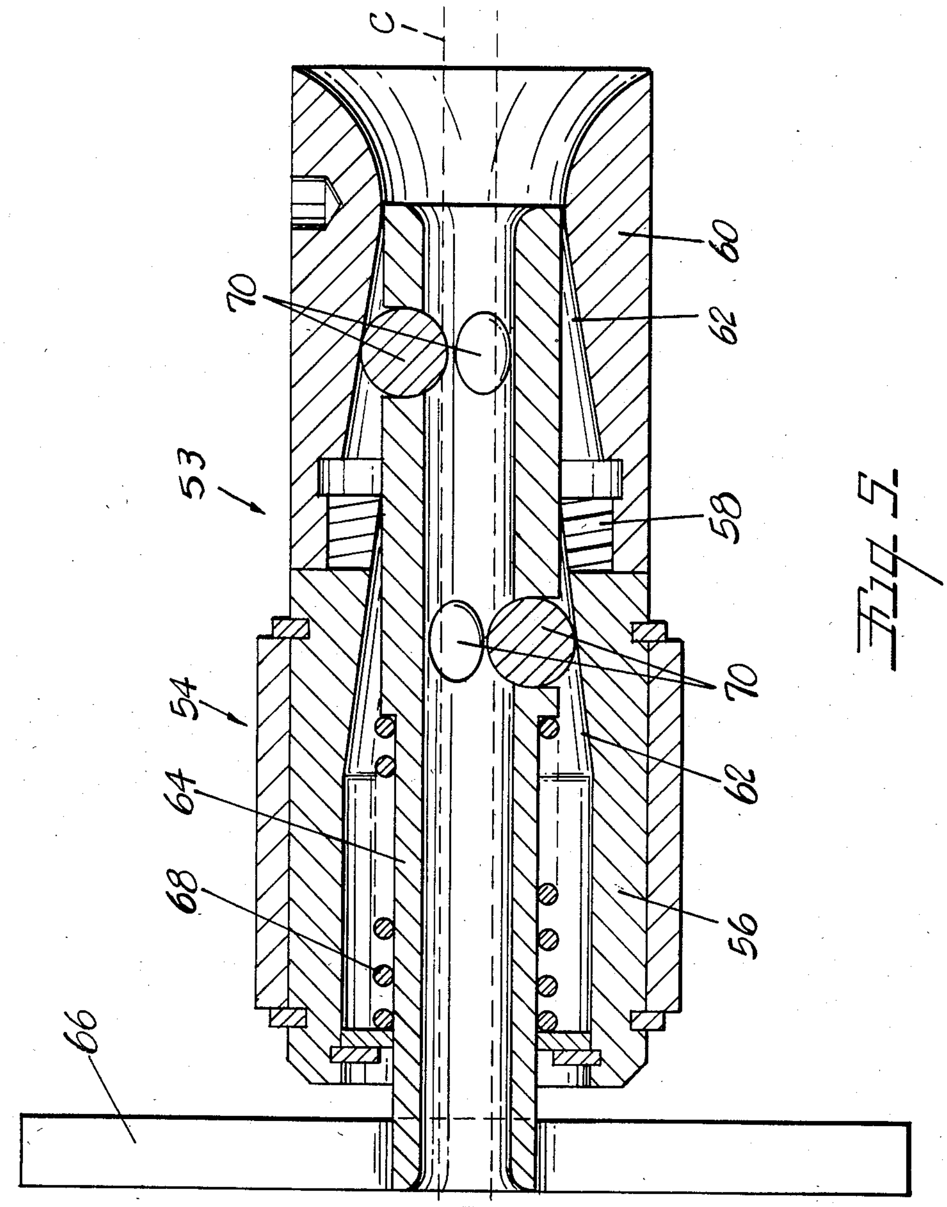
FIG. 5 is an enlarged, longitudinal, cross sectional view through one of the cable grippers, taken along the plane of the line 5—5 in FIG. 2.
Figure 6:
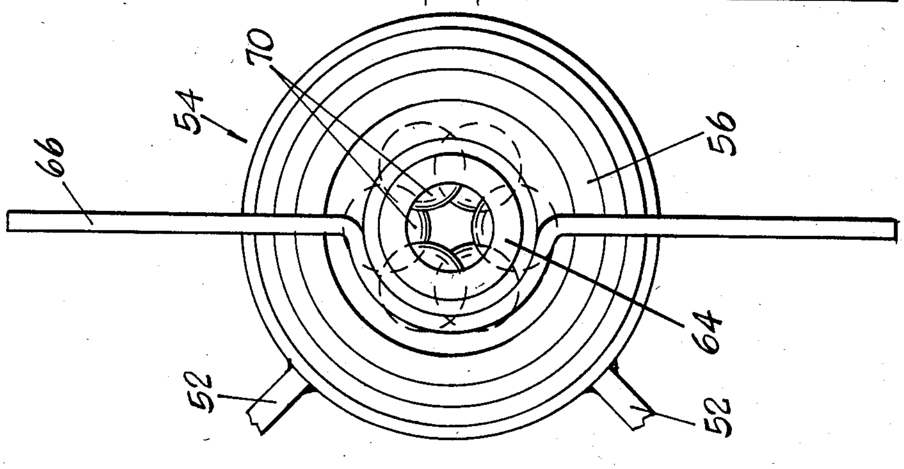
FIG. 6 is an elevational view of the rear end of the gripper shown in FIG. 5.

Mounted on the sides of the screw support tube 40, by means of laterally converging wing plates 52, are two tubular cable grippers 53 which are shown more particularly in FIGS. 5 and 6. It is pointed out here that stranded steel cables attached to the work, ore one cable wrapped around the work, may have their ends passed through the grippers where they may be pulled tight in the same general plane as the bit of the drill 50 and on opposite sides of the bit axis. As a result of the location of the grippers, the pressure of the drill against the work as the drill is advanced by the feed screw can only tighten the drill and its supporting carriage with respect to the work; thus assuring accurate drilling.

FIGS. 5 and 6 show the details of the cable gripper 53. The wing plates 52 are welded to the periphery of a cylindrical bushing 54 which receives the rear body part 56. The forward end of part 56 has a threaded neck 58 that receives the rear end of a forward tube partt 60. The interiors of both parts 56 and 60 are provided with forwardly tapering necks 62. Slidably received into both necks is a release tube 64 with a handle 66 on its rear end. A spring 68 urges the tube forward; and two sets of three angularly spaced holes hold six gripper balls 70 between the surface of a stranded anchor cable shown by dotted lines at C and the tapered surfaces 62. Once cable C is tensioned through the gripper, the six balls seat in each groove of a strand cable, and the drill support cannot be moved relative to the work until the handles 66 are pulled back.

Figures 2, 3, 4:
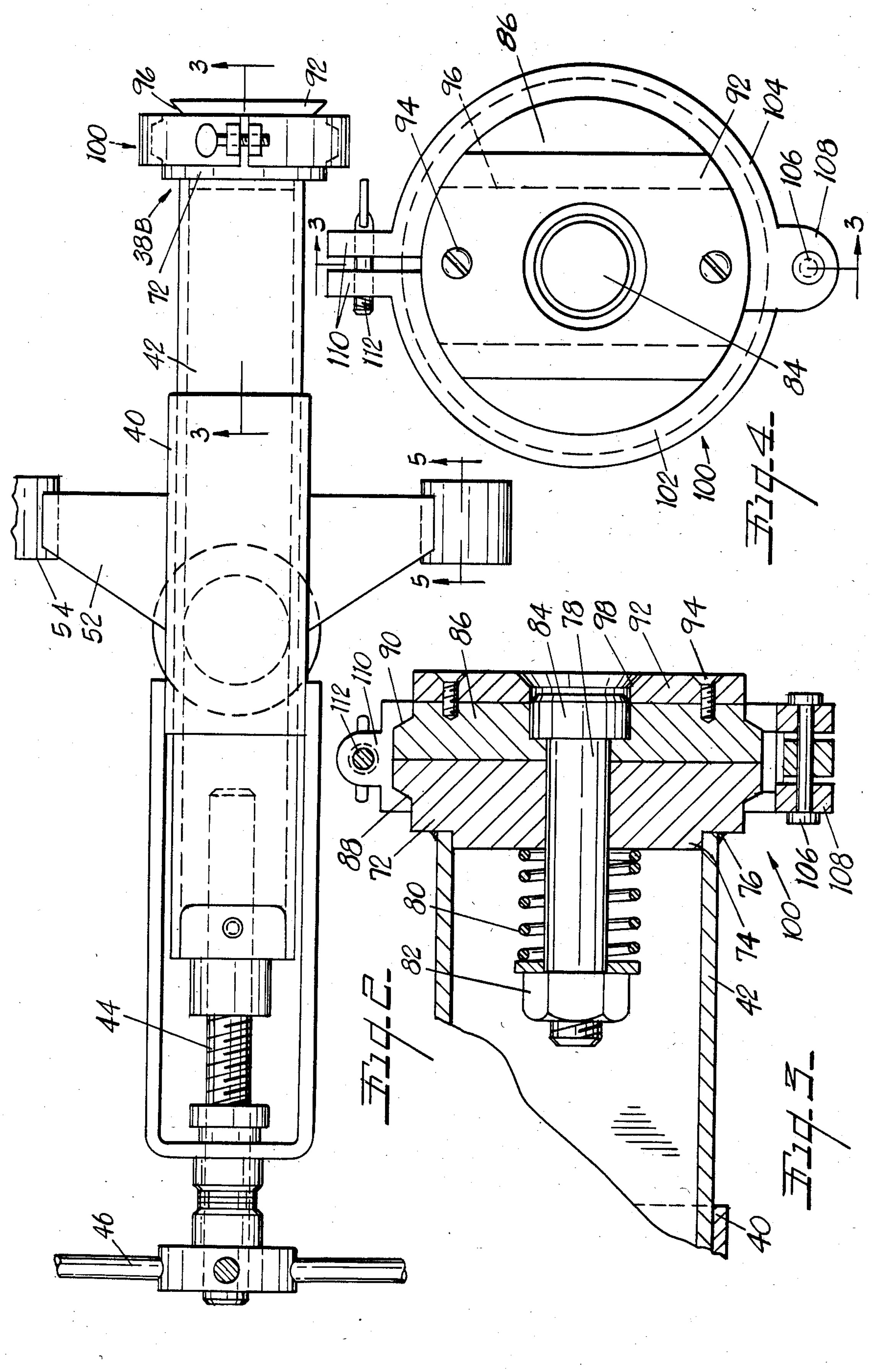
FIG. 2 is an enlarged fragmentary plan view of the manual feed for the drill, and the grippers for securing tension cables between the drill support and the work.
FIG. 3 is a fragmentary, further enlarged, cross sectional view taken along the plane of the line 3—3 in FIGS. 2 and 4.
FIG. 4 is an enlarged end elevational view of the male gripper portion of the connector on the drill support in FIG. 3.

FIGS. 2, 3 and 4 show the angularly adjustable portions of the connector assemblies 38 and 38B. A relatively fixed circular or disc part 72 has a rectangular projection or neck 74 which is pressed into the end of the inner slide 42, which is of rectangular cross section. The tube is welded to the disc as at 76.

The disc 72 has a central bore slidably receiving and rigidly guiding the shank of a bolt 78. A spring 80 sleeved around the inner end of the bolt is compressed between the abutment nut 82 and the inner side of the disc. The head 84 of the nut is press fitted into a socket in a circular indexing plate 86, which is thus held firmly but yieldably against the disc 72. The periphery of the disc 72 has a tapered rim 88 therearound which mates with an oppositely tapered rim 90 on plate 86. Secured to the outer face of the indexing plate is a dove-tail plate 92 secured in diametrical relation across the index plate by screws 94, and under-cut as at 96. It is apparent that any part clamped against the plate 72 by the male dove-tail 92 may be rotated through 360 degrees about the axis of the tool support slide 42 and locked in position. Attention is invited to the recessed taper 98 in the male dove-tail, centered on the head 84 of the bolt 78.

A split clamp ring, indicated generally at 100, has opposed sides 102 and 104 pivoted together by the pivot 106 through ears 108. Opposite ears 110 can be drawn together by a clamp screw 112. (See FIG. 4). The inner surfaces of the sides of the ring parts 102 and 104 define sectors of inner tapered circles that engage the tapered rims 88 and 90 on the plates 72 and 86. Infinite angular adjustment of the male dove-tail part 92 is thus possible.

Figure 8:
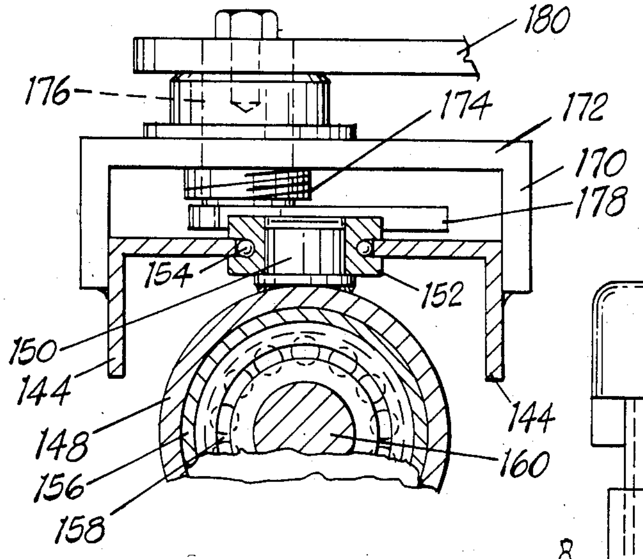
FIG. 8 is an enlarged, fragmentary, cross sectional view of the power dirve feed support taken along the plane of the line 10—10 in FIG. 7.
Figure 7:
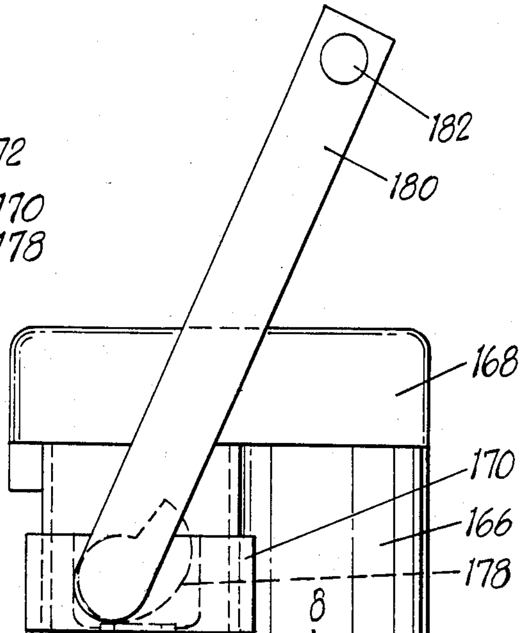
FIG. 7 is a fragmentary side elevational view of an interchangeable intermediate connector member between the arm of the support shown in FIG. 1 and a modified, power driven, drill support.
Figure 7:
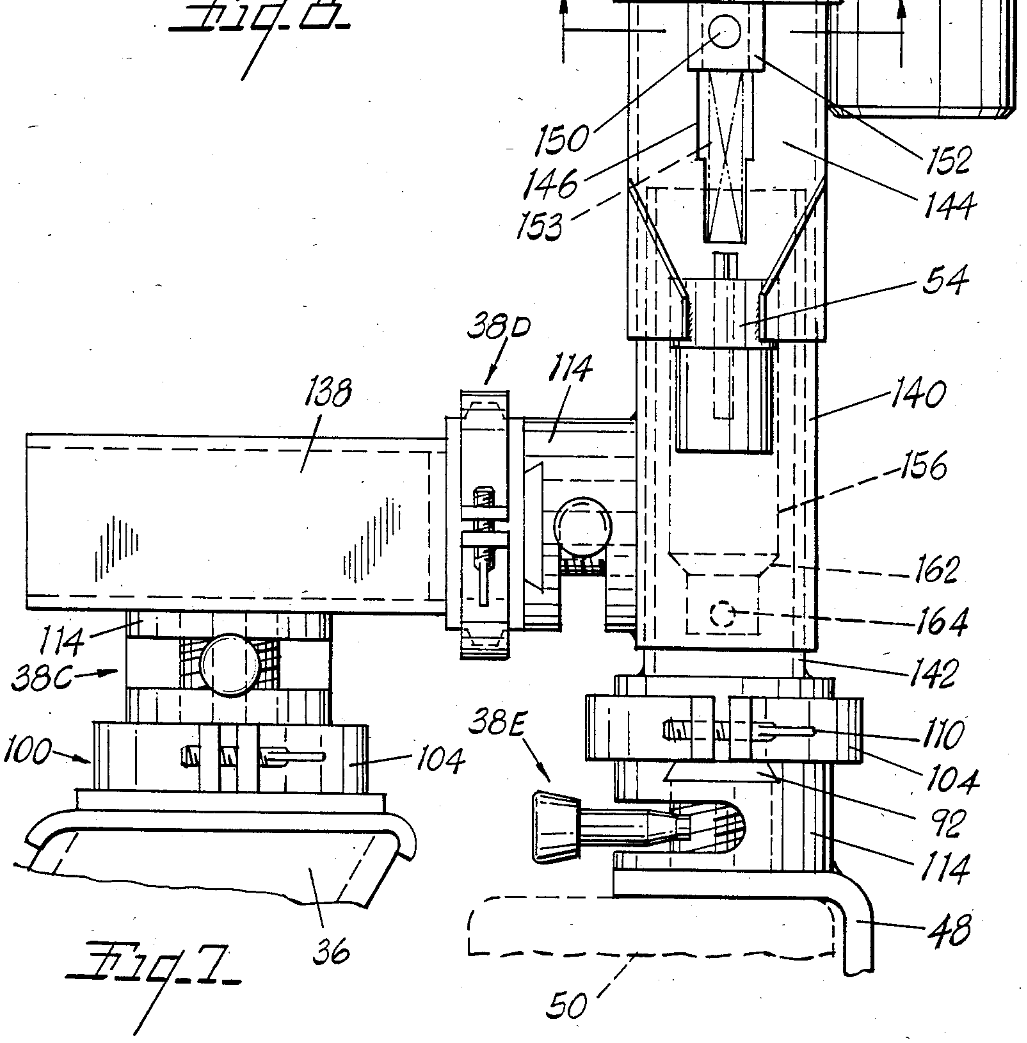

FIGS. 7 and 8 illustrate a modification and an alternative mounting for the drill support. A relatively short intermediate tubular support 138 of rectangular cross section has the female dove-tail body 114 of a third adjustable and releasable connection 38C secured to its underside; to co-act with the male dove-tail part 92 of connection 38 on the strut 36 in FIG. 1. Mounted on a horizontally projecting end of the intermediate support is a fourth releasable connection 38D having the same adjustable male dove-tail 92 as that of connection 38B in FIG. 1. The releasable clamp and cylindrical block 114 of connection 38D is secured to one side of a tubular rectangular tool feed support 140, which is angularly adjustable about the axis of connection 38D in a vertical plane. A drill feed slide 142 also of rectangular tubular cross section is reciprocable in the support tube by means which will be described presently. On its end, which is downward in the position illsutrated, the feed slide 142 carries the male dove-tail part 92 of a fourth releasable gripper connection 38E. The cylindrical body or block 114 may be the same one as that shown in FIGS. 1, 7 and 8 which supports the drill 50. Connection 38D may be attached directly to connection 38 in FIG. 1, if desired.

Figure 9:
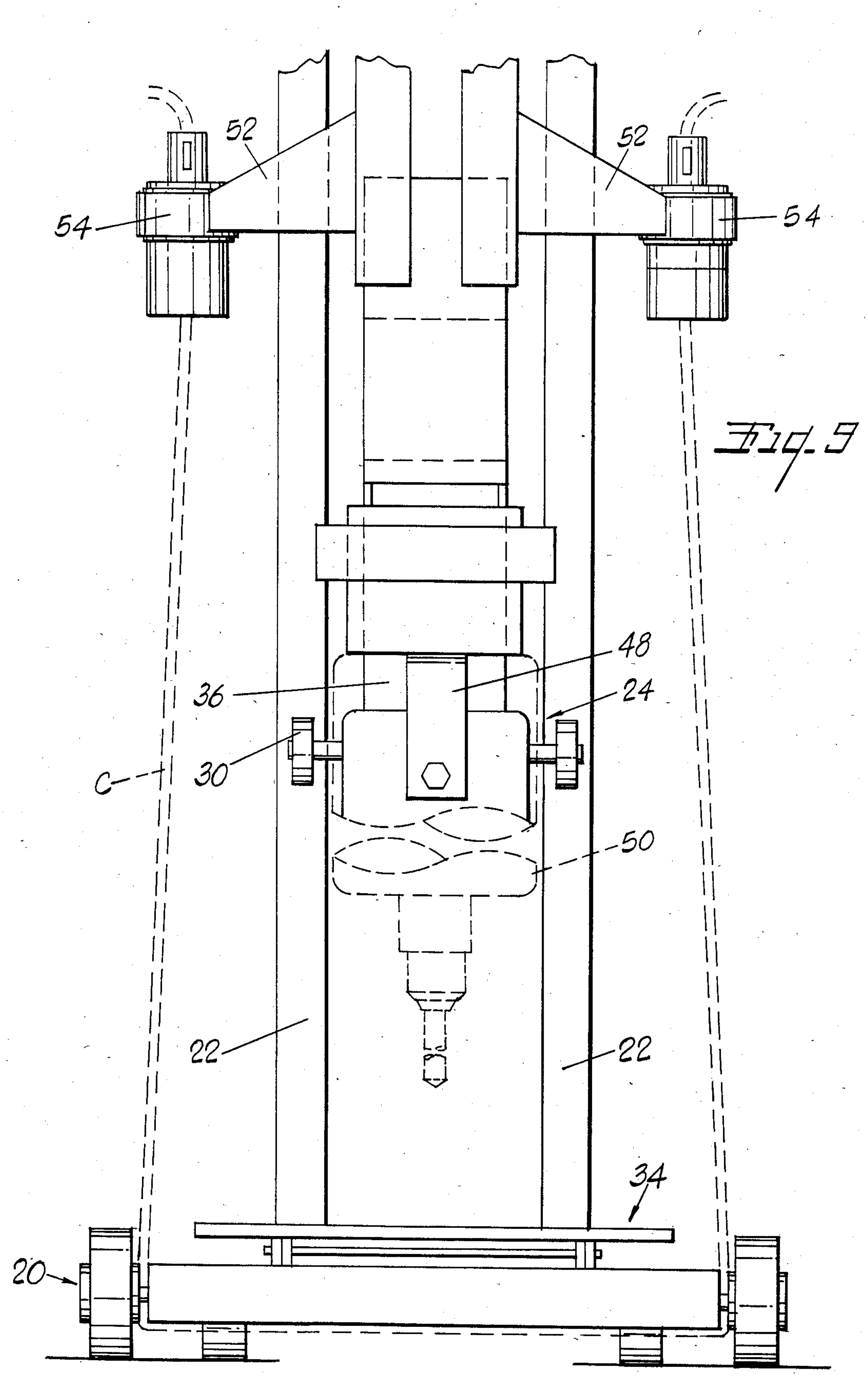
FIG. 9 is a front elevational view of the carriage with the intermediate support and power feed of FIGS. 7 and 8 thereon.

The modified power tool feed of FIGS. 9 and 10 has cable grippers 54 on each side the same as those shown in FIGS. 1 and 2. These are attached to oppose C-shaped brackets 144 having their flanges welded to the top and bottom of the tubular supprt 140, with their webs defining longitudinal slots 146 at their rear ends. Positioned between the brackets 144 is a tubular, cylindrical, feed screw support 148 having trunnions 150 welded to each side. The trunnions are engaged in cross-head slides 152 with slotted edges which travel along the edges of the slots 146. Springs 153 bias the cross-head slides upwardly. Bearings 154 roll in the slots for smooth travel. Within the screw support 148 is the cylindrical slide 156 of a power driven tool feed. A circulating ball screw nut 158 held in the rear of the slide tube by a jamb nut (not shown) causes the slide tube 156 to move axially upon rotation of a driven screw 160. The outer or lower end of the tube 156 carries an end plug 162 which is connected to the rectangular tubular slide 142 by a cross pin 164. The screw 160 is driven by a motor 166 through a gear box 168. The power driven tool feed, including the cylinder 148, trunnions 150, slide 156 and circulating ball nut 158, screw 160, motor 166 and gear box 168 are parts of a commercially available power drive unit and so are not disclosed or described in greater detail. By means of suitable controls (not illustrated) the drive unit can force the pin 164 and in turn the rectangular tubular support 142 downwardly or retract it upwardly as shown in FIG. 9.

Welded to the channel plates 144 near the backs or upper ends thereof are opposed C-clips 170 with their webs 172 spaced outwardly from the channel plates. A tubular bushing 174 is threaded through each clip just rearwardly of the slots 146, and supports a short cam shaft 176 extending through each bushing and rotatably carrying a cam 178 in abutting relation to the rear or upper ends of the cross-head slides 152. Levers 180 connected to the outer ends of the cam shafts 176 are connected by a common cross bar handle 182.

With the drill support as a whole adjusted to the desired location and position as shown in FIG. 9, the drill 50 may be advanced and retracted by either or both actuation of the motor 166 and the handle 182. It is anticipated that the handle 182 and cams 178 will be used primarily to "spot" or test the location of the drill bit, and that thereafter the power feed will be actuated to complete the drilling. However, when drilling holes in thin material, the cams 178 and handle 182 may be used to complete the hole without activating the motor 166.

OPERATION

In all operating positions of either the manual feed shown in FIG. 9, the cable grippers 54 lie in a plane which includes the axis of the bit of the drill 50, and on oppisite sides of the axis. It will be evident that cables C when anchored to the work and drawn tight through the grippers as shown in FIGS. 5 and 6 will rigidify the position of the drill 48 and its line of feed. With the alternate intermediate tubular support 138 mounted on the strut 36, and either the manual feed of support tube 40 or modified tube 140 of the power feed attached thereto, the drill 50 can be adjusted and fed vertically. The platform 34 can be folded out as shown, and work may be brought to the carriage 20 instead of vice-versa. Anchor cables connected between the sides of the platform and the grippers act as stabilizing guys, and the drill may be utilized as a drill press. By raising the arm 24 and strut 36 on the carriage 20, and interposing the intermediate support tube 138, the drill support, with either manual feed or power feed, provides the function of a drill press with a very wide or high throat above the platform.

The several dove-tail connections 38 permit quick adjustment of position and interchange of parts of the support, while maintaining rigid connections in all positions. Both modifications, in FIG. 1 and FIG. 9, permit orbital adjustment of the position of the drill 50 through 360 degrees about the vertical axis of connections 38 and 38C, as well as angular adjustment of the body of the drill about the drill bit axis to clear obstructions. The addition of the intermediate support and dove-tail connection 38D adds a third plane of adjustment abouth the horizontal axis.

While the male dove-tail parts 92 of the connections 38 are shown on the parts of the assembly closest to the strut 36, the positions of these could be reversed with the female parts 114 if desired.

What is claimed to be new and what is desired to be secured by Letters Patent is defined in the following claims:

1. In combination on a wheeled platform having an upright column near its rear edge with a vertically adjustable arm on said column projecting forwardly over the platform with a first upwardly facing dove-tail connector part on the end of the arm, a drill feed support tube of non-circular cross section having a slide tube of non-circular cross section telescopically and slidably received therein, a second dove-tail connector part on the end of said slide tube adapted to be releasably and rotatably connected to an electric drill with the chuck axis of the drill closely adjacent and parallel to the axis of the slide tube, a third dove-tail connector part secured to a side of said support tube and releasably and rotatably connectable to said first connector part, a feed screw having a thrust connection at one end to said feed support tube and a traveling nut drivingly engaged with the opposite end of said slide tube from said second connector part, and a pair of releasable cable grippers connected to opposite sides of said support tube and in spaced parallel relation to the sides and axis of the tube.

2. The combination as defined in claim 1 in which said grippers comprise a first tubular body part defining a forwardly diminishing internal taper, a second tubular body part defining a like internal taper and having an axially releasable connection to the first body part, a tubular gripper ball carrier arranged axially through both said body parts and defining two sets of radial gripper ball receiving passages arranged in angularly spaced relation with the sets spaced axially the same as the tapers in the body parts, spring means biasing said ball carrier toward the narrower ends of said tapers, gripper balls in said ball receiving passages and projection there through, and a release handle connected to said ball carrier exteriorly of said body parts.

3. The combination as defined in claim 2 wherein one of said body parts of said grippers is connected to the opposite sides of said drill feed support by being received in a tubular bushing connected by a wing plate to the sides of the feed support, and the connection between the sets of body parts consists of mating threads on the parts.

4. The combination as defined in claim 1 in which said releasable and rotatable connections each comprise a body part defining a dove-tail portion on one face and an internally threaded bore opening at one end normally through the face, an externally threaded locking plug adjustably received in said bore, said body part defining a transverse slot parallel to said one face and extending substantially into said bore to expose a substantial portion of the surface of the thread on said plug, said plug defining a diametrical passage parallel to one face of the plug and having an internal thread at one end, and a lock pin having one end threadedly engaged in the thread in said diametrical passage and projecting through said slot in said body part to a manually operable part exteriorly of the body.

5. The combination as defined in claim 4 in which said dove-tail portion is female slot, said transverse slot extending beyond the radial center of the body part.

6. The combination as defined in claim 4 in which the periphery of said plug defines an axial slot intersecting the diametrical passage in the plug at the opposite end thereof from the internally threaded end of the passage.

7. The combination as defined in claim 6 in which the axial slot in said plug extends through each end of said plug, and the end of the diametrical passage has an inwardly reducing tapered portion, said lock pin having a taper thereon engagable with the reducing taper to wedge the threads on said plug adjacent said axial slot in said plug.

8. The combination as defined in claim 1 in which there is an intermediate tubular support having part of said first connection on one side, whereby said intermediate support is rotatable about said vertical axis, and a third releasable and rotatably adjustable connection having a part mounted on the end of said intermediate support and supportingly engaging said drill feed support.

9. The combination as defined in claim 8 in which said third connection is rotatably adjustable about the axis of said intermediate tubular support.

10. The combination as defined in claim 9 in which the feed screw on said feed screw support is connected to be driven by a motor also mounted on the screw support.

11. A support for an electric drill comprising first and second rotatably adjustable and selectively disconnectable connector parts, the first of said parts being adapted to be connected to said drill co-axially with the axis of the chuck of the drill, a hollow feed tube of rectangular cross section connected to the other of said connector parts co-axially with the axis of the parts, a support tube of rectangular cross section slidably receiving said feed tube, a feed screw extending into said feed tube and drivingly connected thereto adjacent its end opposite said first and second parts, means for rotating said screw supportedly connected to said support tube, a third connector part permanently connected to one side of said support tube and adapted to co-act with and be removably connected to a fourth connector part as a support, and a pair of cable grippers connected to opposite sides of said support tube in spaced relation thereto and with their gripping axis parallel to the axis of the support tube.

12. A support as defined in claim 11 in which said means for rotating said screw comprises a motor drivingly connected to the screw.

* * * * *